(12) United States Patent
D'Agosto, III

(10) Patent No.: US 6,321,129 B1
(45) Date of Patent: *Nov. 20, 2001

(54) ENHANCED USER CONTROL OPERATIONS FOR PORTABLE DIGITAL AUDIO RECORDER

(75) Inventor: Nicholas A. D'Agosto, III, Trumbull, CT (US)

(73) Assignee: Dictaphone Corporation, Stratford, CT (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/224,518

(22) Filed: Dec. 31, 1998

Related U.S. Application Data
(60) Provisional application No. 60/078,330, filed on Mar. 17, 1998.

(51) Int. Cl.[7] .................................................. G06F 17/00
(52) U.S. Cl. ........................ 700/94; 360/137; 360/69
(58) Field of Search ........................... 700/94; 704/272, 704/270, 278; 40/124; 369/25, 27; 360/74.01, 69–70, 73.04–73.08, 137, 71–72.3, 74.1–75, 81–96.6; 200/1 R, 1 B

(56) References Cited

U.S. PATENT DOCUMENTS

| | | | |
|---|---|---|---|
| 4,686,587 | * 8/1987 | Hipp et al. | 360/74.2 |
| 5,245,694 | * 9/1993 | Zwern | 395/2 |
| 5,491,774 | * 2/1996 | Norris et al. | 369/29 |
| 5,542,103 | 7/1996 | Mottier et al. | 455/89 |
| 5,548,566 | * 8/1996 | Baker | 369/25 |
| 5,548,832 | 8/1996 | Karam | 455/226.4 |
| 5,583,382 | 12/1996 | Wagner | 307/10.1 |
| 5,689,802 | 11/1997 | Luzzatto | 455/11.1 |
| 5,774,863 | * 6/1998 | Okano et al. | 704/278 |
| 5,841,979 | * 11/1998 | Schulhof et al. | 395/200.67 |
| 5,842,170 | * 11/1998 | Daberko et al. | 704/278 |
| 6,031,915 | * 2/2000 | Okano et al. | 381/56 |
| 6,038,199 | * 3/2000 | Pawlowski et al. | 369/25 |
| 6,055,500 | * 4/2000 | Terui et al. | 704/270 |

* cited by examiner

Primary Examiner—Forester W. Isen
Assistant Examiner—Laura A. Grier
(74) Attorney, Agent, or Firm—Kramer Levin Naftalis & Frankel LLP; Gregor N. Neff

(57) ABSTRACT

A portable sound recording device includes a microphone, a speaker and recording/playback circuitry connected to the microphone and speaker. The recording/playback circuitry includes a recording medium such as a removable solid state memory card. A control circuit controls operation of the recording/playback circuitry on the basis of input signals generated by a user via an operating switch array. The switch array includes a record switch. If the record switch is actuated for only a brief period of time, a record-lock mode of operation is implemented. If the record switch is actuated for a longer period of time, a momentary-record mode is entered which lasts only as long as the record switch remains in an actuated position.

10 Claims, 3 Drawing Sheets

ENHANCED USER CONTROL OPERATIONS FOR PORTABLE DIGITAL AUDIO RECORDER

REFERENCE TO RELATED APPLICATION

This is a continuation-in-part of prior provisional patent application Ser. No. 60/078,330, filed Mar. 17, 1998.

FIELD OF THE INVENTION

This invention relates to portable sound recording devices.

BACKGROUND OF THE INVENTION

Portable sound recording devices are well known. For many years, very compact portable tape recorders have been available in a size which fits comfortably in the palm of the user's hand. These portable recorders are used to record spoken words or other sounds in analog form on removable magnetic tape cassettes. Subsequently, palm-size digital audio tape recorders were introduced, and still more recently, compact devices which record digitized sound signals on embedded or removable solid state recording media have come on the market.

Many of the known compact recorders provide basic functions such as record, stop, play, rewind and fast forward. To permit a user to selectively actuate these functions, a number of manually operable switches are typically provided on the housing of the recorder.

It would be desirable to provide additional functions in a compact sound recorder without increasing the number of switches, since adding further switches tends to increase the cost of manufacturing the recorder, and may also require the size of the recorder to be increased.

OBJECTS AND SUMMARY OF THE INVENTION

It is an object of the invention to provide a portable sound recorder in which a user may access more than one type of recording function by actuating only a single record button.

A portable sound recording device provided in accordance with the invention includes a microphone, a speaker, and recording/playback circuitry connected to the microphone and speaker. The recording/playback circuitry includes a recording medium, such as a removable solid state memory card, on which a sound signal is recorded and from which the sound signal is reproduced. A control circuit such as a microprocessor controls the operations of the recording/playback circuitry, on the basis of input signals generated by a user by means of an operating switch matrix. As an alternative to the switch matrix, a linear array of switches connected to a voltage divider may be utilized. The switch matrix includes a record switch. The response provided by the control circuitry to actuation of the record switch depends on the period of time during which the record switch is maintained in an actuated position. If the record switch is placed in an actuated position for only a brief period of time (say, less than one second) the control switch changes the recording device over from a stop mode to a record mode. That is, if the recording device is in the stop mode at the time that the brief actuation of the record switch occurs, then the recording device is placed into the record mode, and the record mode is maintained indefinitely.

On the other hand, if the record switch is maintained in an actuated position for an extended period of time, say, one second or more, then the recording device is maintained in the record mode, and the record mode continues only so long as the record switch is maintained in the actuated position.

The present invention permits a record-lock function to be added to a portable recorder without adding another control switch or a further control position to an existing switch. Moreover, the user's selection between record-lock and controlled-duration recording is quite intuitive. If recording for an indefinite period is desired, the user actuates the record switch briefly and then takes no further action as recording continues. If the user wishes to control the duration of the recording mode, he or she simply keeps the record switch in its actuated position for as long as recording is desired. There is no requirement that the user be aware of what mode the recorder is in or that the user consciously navigate among various modes. In effect, the recorder adapts itself to the user's desired mode of operation.

The foregoing, and other objects, features and advantages of the invention will be further understood from the following detailed description of preferred embodiments and from the drawings, wherein like reference numerals identify like components and parts throughout.

DESCRIPTION OF PREFERRED EMBODIMENTS

Figure 1:
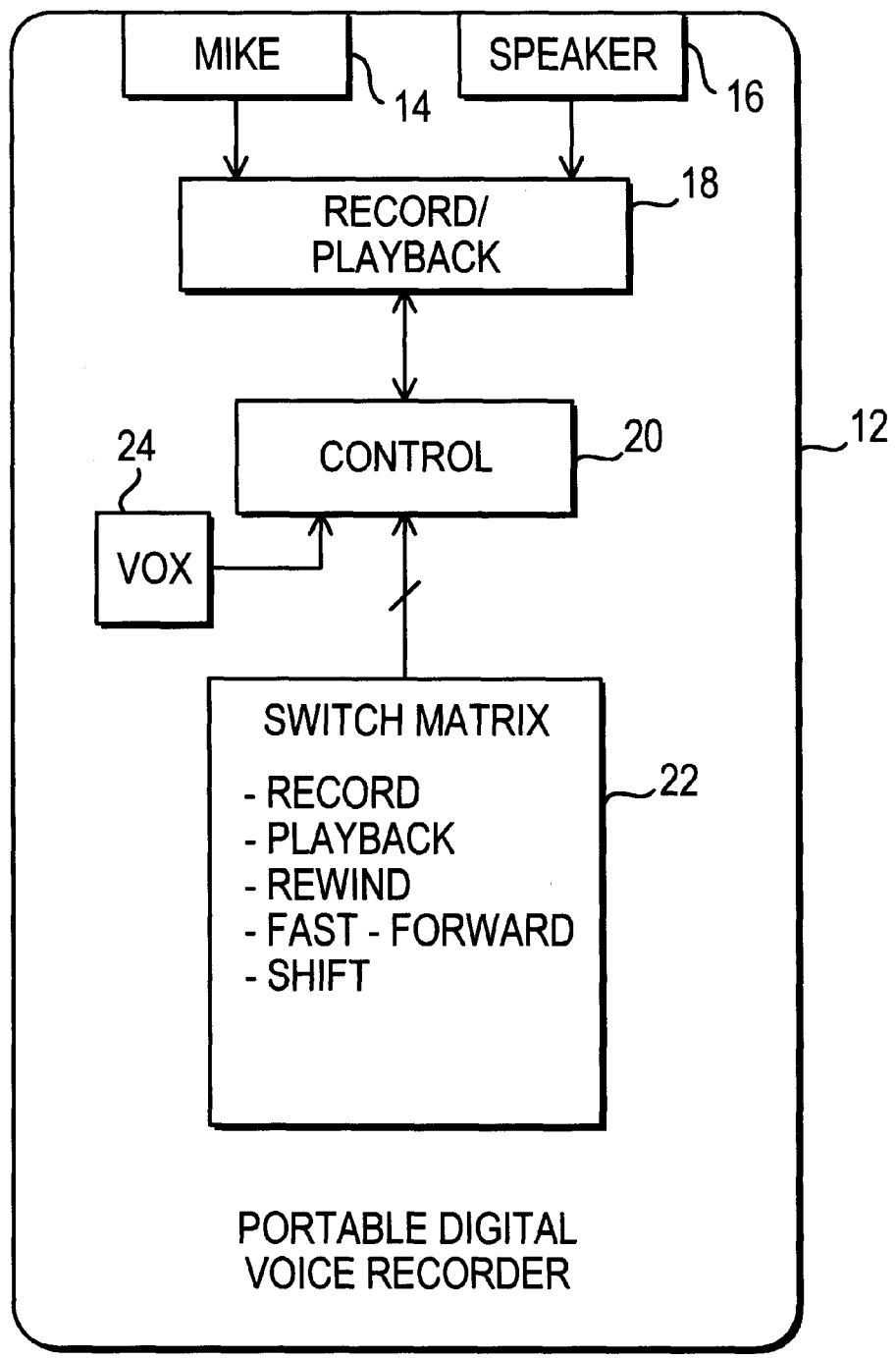
FIG. 1 is a schematic block diagram of a portable voice recorder in which the present invention is applied.

FIG. 1 schematically illustrates a portable digital voice recorder 10 in which the present invention is applied. The recorder 10 includes a housing which is schematically indicated at reference numeral 12. Preferably the housing 12 is shaped and sized to be held in the palm of the operator's hand.

A microphone 14 and speaker 16 are within the housing 12. A record/playback circuit 18 receives electrical sound signals generated at the microphone 14 and records such signals on a recording medium (not separately shown). The recording medium may be, for example, a standard removable solid state memory card or a magnetic tape cassette. If digital recording is to be carried out in the recorder 10, as is the case when the recording medium is a solid state memory card, the record/playback circuit 18 includes analog-to-digital conversion circuitry. In this case the record/playback circuit 18 also may include data compression/decompression circuitry.

The record/playback circuit 18 is operable to reproduce a stored sound signal from the recording medium and to process the reproduced signal so as to provide an output signal suitable for driving the speaker 16.

A control circuit 20 is connected to exchange signals with the record/playback circuit 18. The control circuit 20 controls operation of the record/playback circuit 18 and of the recorder 10 in general. The control circuit 20 may be constituted by a microprocessor or microcontroller, and should also be understood to include program memory and working memory, which are not separately shown.

The recorder 10 also includes a set of operating switches 22 which are actuatable by the user to provide input to the control circuit 20. As indicated in FIG. 1, the switch matrix 22 may include switch keys for actuating a number of functions including Record, Playback, Rewind, Fast- Forward and Shift. It is to be understood that some of these keys may be omitted, and/or that additional keys may be provided.

The switch keys in the switch matrix 22 each operate a respective switch which is movable between a first position (non-actuated) and a second position (actuated). In a preferred embodiment of the invention, some or all of the switches, including the record switch, are biased toward the first (non-actuated) position. It is contemplated that some of the switches may be actuated by a shared key configuration, such as a rocker switch.

Figure 2:
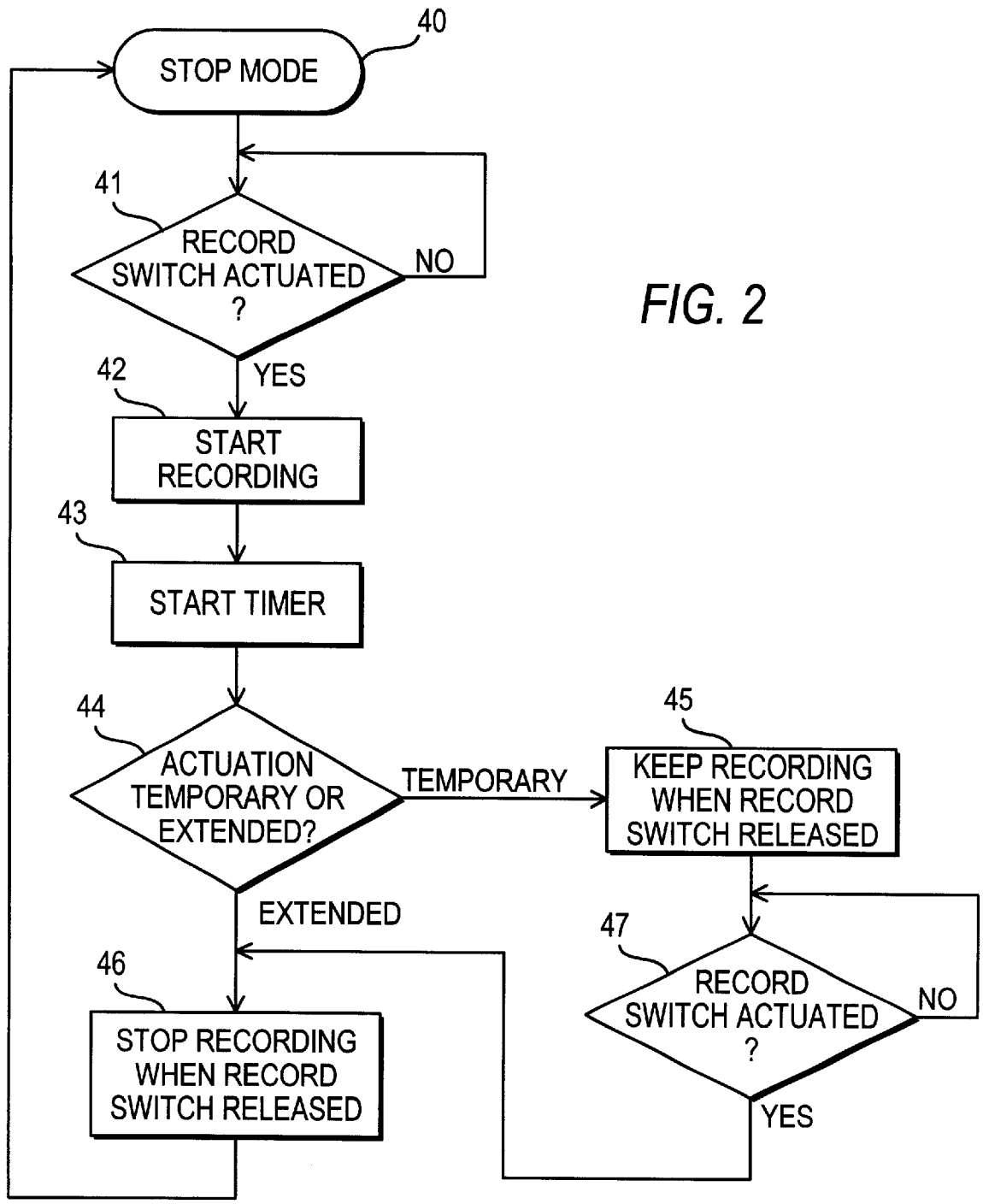
FIGS. 2 and 3 are flow charts which illustrate software which programs the control circuit of the recorder of FIG. 1 in accordance with the invention.

FIG. 2 illustrates in flow-chart form software which controls certain operations of the control circuit 20 in connection with reading the status of the switch matrix 22 and changing the operating mode of the recorder 10 on the basis of control signals input through the switch matrix 22.

For the purposes of FIG. 2, it is assumed that the recording control function is entered from stop mode, as indicated at block 40. (However, it is also contemplated that recording may be initiated when the recorder is in a mode other than stop mode.) It is then determined, as indicated at a decision block 41, whether the record switch has been placed in its actuated position. If not, the control flow idles (as indicated in FIG. 2), or alternatively proceeds to another portion of a control loop (not shown). If at step 41 it is found that the record switch has been placed in its actuated position, then the control flow proceeds to step 42, at which recording commences. Following step 42 is step 43, at which a timing function is commenced. Then, as indicated at step 44, it is determined whether the actuation of the record switch is "temporary" or "extended". That is, it is determined whether the timing function times out before the record switch is released. If not, then the actuation of the record switch is determined to be "temporary" (for example, less than one second in duration) and step 45 follows, at which it is established that recording will continue when the record switch is released.

Accordingly, it will be recognized that a "temporary" actuation of the record switch leads to operation of the recorder 10 in a "record-lock" mode, in which recording continues without requiring the user to maintain the record switch in an actuated position.

If the actuation of the record switch is "extended" (one second or longer), then step 46 follows step 44, so that recording will cease when the record switch is released. Actuation of the record switch for an "extended" period thus leads to operation in a "momentary-record" mode. In this mode, recording continues only for as long as the record switch is maintained in the actuated position. Consequently, the control flow returns to the stop mode after step 46 when the record switch is released.

Returning to block 45, which corresponds to the "record-lock" mode, a decision block 47 follows block 45. At block 47, it is determined whether the record switch has again been actuated. If not, the control loop idles in a recording mode. Otherwise, i.e. upon the next actuation of the record switch, block 46 is entered, so that recording ceases when the record switch is released and stop mode follows. It is contemplated, though not illustrated in FIG. 2, that actuation of switches other than the record switch may also cause the "record-lock" mode to be terminated. It will be understood from the foregoing that the manner in which the control circuit 20 interprets and responds to actuation of the record switch varies according to the length of time that the record switch is maintained in its actuated position. The user may select either the record-lock function or the momentary-record function by operating a single switch which has only two positions—actuated or not actuated. There is no need to provide either a separate record-lock switch or a third operating position for the record switch.

The user interface provided by the present invention is also quite intuitive. If the user wishes to directly control the duration of the recording mode, he or she simply actuates the record switch for as long as recording is desired. If the user wishes to invoke the record-lock mode and then "forget about it", a brief actuation of the record switch suffices.

It is contemplated in accordance with the invention that the control circuit 20 will also vary its interpretation of, and response to, actuation of other switches, including the rewind and fast-forward switches, depending on the length of time that such switches are actuated. For example, if the rewind or fast-forward key is briefly actuated, the recorder is latched into a rewind or fast-forward mode that continues until the user again actuates the respective key (or another key such as a "stop" key, which is not shown). An extended actuation of the rewind or fast-forward key causes the respective function to be maintained until the key is released. In this case the operating mode is referred to as "momentary rewind" or "momentary fast-forward", as the case may be. It is also contemplated that extended actuation of either of these keys would cause the respective function to "accelerate" until the key is released.

As is well known to those who are skilled in the art, when a recorder is operated in a "VOX" mode, recording occurs if and only if sound energy at a given level or above is present at the microphone of the recorder. In a preferred embodiment of the invention, a signal lamp (not shown), such as an LED, is illuminated when the recorder is recording a sound signal. If the recorder is in the VOX mode, and recording is not taking place because no audible sound is present at the microphone, then the LED may be operated so as to flash to indicate that record mode is in effect but recording is not actually taking place. The VOX mode may be activated by a conventional method, such as entry of appropriate control signals during software set-up, or by a two-position slide switch, indicated at 24 in FIG. 1. As will be understood by those who are skilled in the art, it may be quite desirable to select the VOX mode in conjunction with the record-lock mode in order to prevent recording of "dead air" in the record-lock mode.

Figure 3:
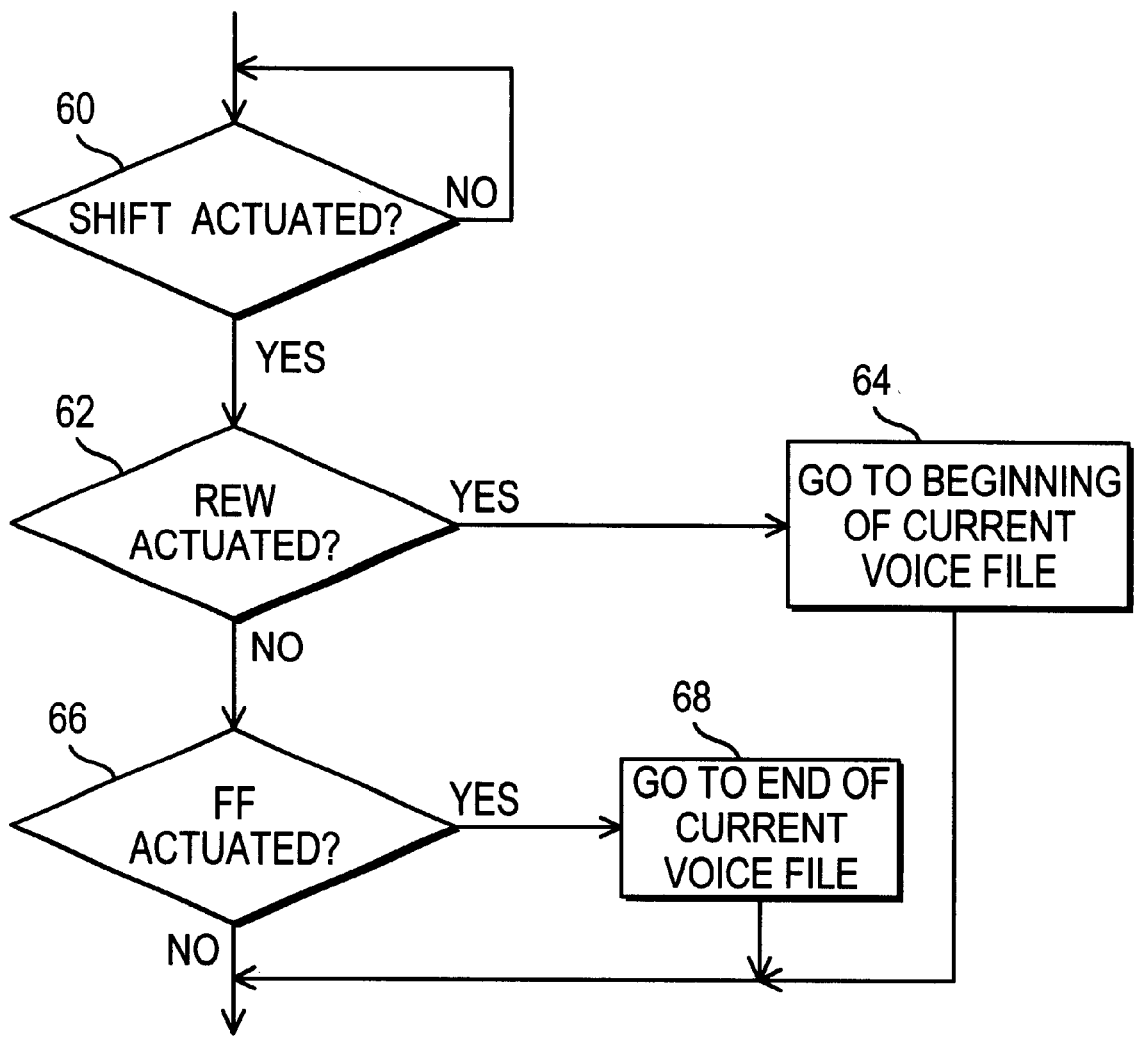

FIG. 3 illustrates additional software which is provided to control operation of the control circuit 20 in connection with interpretation of and response to control signals input by the user via the switch matrix 22. As indicated at step 60 in FIG. 3, it is determined whether the shift key is actuated. If not, the control flow idles (as indicated in FIG. 3), or alternatively proceeds to another portion of a control loop (not shown). If it is determined at step 60 that the shift key has been actuated, it is next determined whether the rewind key has been actuated (step 62). If so, the control circuit 20 shifts a pointer to the beginning of the currently accessed voice file (step 64). Playback from the beginning of the file then may occur automatically, or, according to an alternative embodiment of the invention, the recorder may idle, with recording or playback to occur at the beginning point of the voice file upon actuation of the record or playback keys, respectively.

If at step 62 the rewind key was not found to have been actuated, step 66 follows, at which it is determined whether the fast-forward key has been actuated. If so, the control circuit 20 shifts the software pointer to the end of the currently accessed voice file (step 68). The control circuit 20 may be programmed to automatically enter record mode with recording taking place at the end of the current voice file. Alternatively, the recorder may idle until the record key is actuated by the user, at which time an additional sound signal is recorded at the end of the current voice file. The user could also elect to rewind a short distance from the end of the file to review the last information recorded in the file.

If at step 66 it is not found that the fast-forward key has been actuated, the control loop proceeds forward, to await another key entry (not indicated in FIG. 3).

In the process shown in FIG. 3, the actuation of the shift key, and then the rewind key or the fast-forward key, may be sequential or concurrent. In the appended claims, actuating the rewind key or the fast-forward key either sequentially after, or concurrently with, the shift key will be referred to as operating the respective key "in combination with" the shift key.

It is to be understood that the above description may indicate to those skilled in the art additional ways in which the principles of this invention may be used without departing from the spirit of the invention. The particularly preferred methods and apparatus are thus intended in an illustrative and not limiting sense. The true spirit and scope of the invention are set forth in the following claims.

What is claimed is:

1. A portable sound recording device, comprising:

a microphone;

a speaker;

recording/playback means connected to the microphone and speaker, said recording/playback means including a recording medium on which a sound signal is recorded and from which the sound signal is reproduced;

control means for controlling operation of said recording/playback means; and a plurality of operating switches for providing user input signals to said control means, said plurality of operating switches including a record switch;

wherein said control means places said recording/playback means in a record-lock mode when the record switch is actuated for less than a predetermined period of time, and said control means places said recording/playback means in a momentary-record mode when the record switch is actuated for more than the predetermined period of time;

wherein, in said record-lock mode, recording continues with the record switch in an unactuated condition, and said momentary-record mode is entered upon actuation of the record switch in said record-lock mode; and wherein, in said momentary-record mode, recording continues so long as the record switch remains in an actuated condition and recording ceases when the record switch ceases to be actuated.

2. A portable sound recording device according to claim 1, wherein said recording medium is a solid state memory.

3. A portable sound recording device according to claim 2, wherein said recording medium is a removable solid state memory card.

4. A portable sound recording device according to claim 1, wherein said control means is a microprocessor.

5. A portable sound recording device according to claim 1, wherein said plurality of operating switches are included in a switch matrix.

6. A method of operating a portable sound recording device, comprising the steps of:

entering a record-lock mode of operation if a record switch is actuated for less than a predetermined period of time; and entering a momentary-record mode of operation if the record switch is actuated for more than the predetermined period of time;

wherein, in said record-lock mode of operation, recording continues with the record switch in an unactuated condition, and said momentary-record mode of operation is entered upon actuation of the record switch in said record-lock mode of operation; and wherein, in said momentary-record mode of operation, recording continues so long as the record switch remains in an actuated condition and recording ceases when the record switch ceases to be actuated.

7. A method of providing rewind functions in a digital portable sound recording device, comprising the steps of:

entering a latched rewind mode of operation if a rewind key is actuated for less than a predetermined period of time;

entering a momentary rewind mode of operation if the rewind key is actuated for more than the predetermined period of time; and rewinding to a beginning point of a currently accessed file if the rewind key is operated in combination with a shift key.

8. A method according to claim 7, wherein a rate at which rewinding is performed is accelerated in said momentary rewind mode as said momentary rewind mode continues.

9. A method of providing fast-forward functions in a digital portable sound recording device, comprising the steps of:

entering a latched fast-forward mode of operation if a fast-forward key is actuated for less than a predetermined period of time;

entering a momentary fast-forward mode of operation if the fast-forward key is actuated for more than the predetermined period of time; and advancing to an end point of a currently accessed file if the fast-forward key is operated in combination with a shift key.

10. A method according to claim 9, wherein a rate at which the fast-forward function is performed is accelerated in said momentary fast-forward mode as said momentary fast-forward mode continues.

* * * * *